Figure 1:
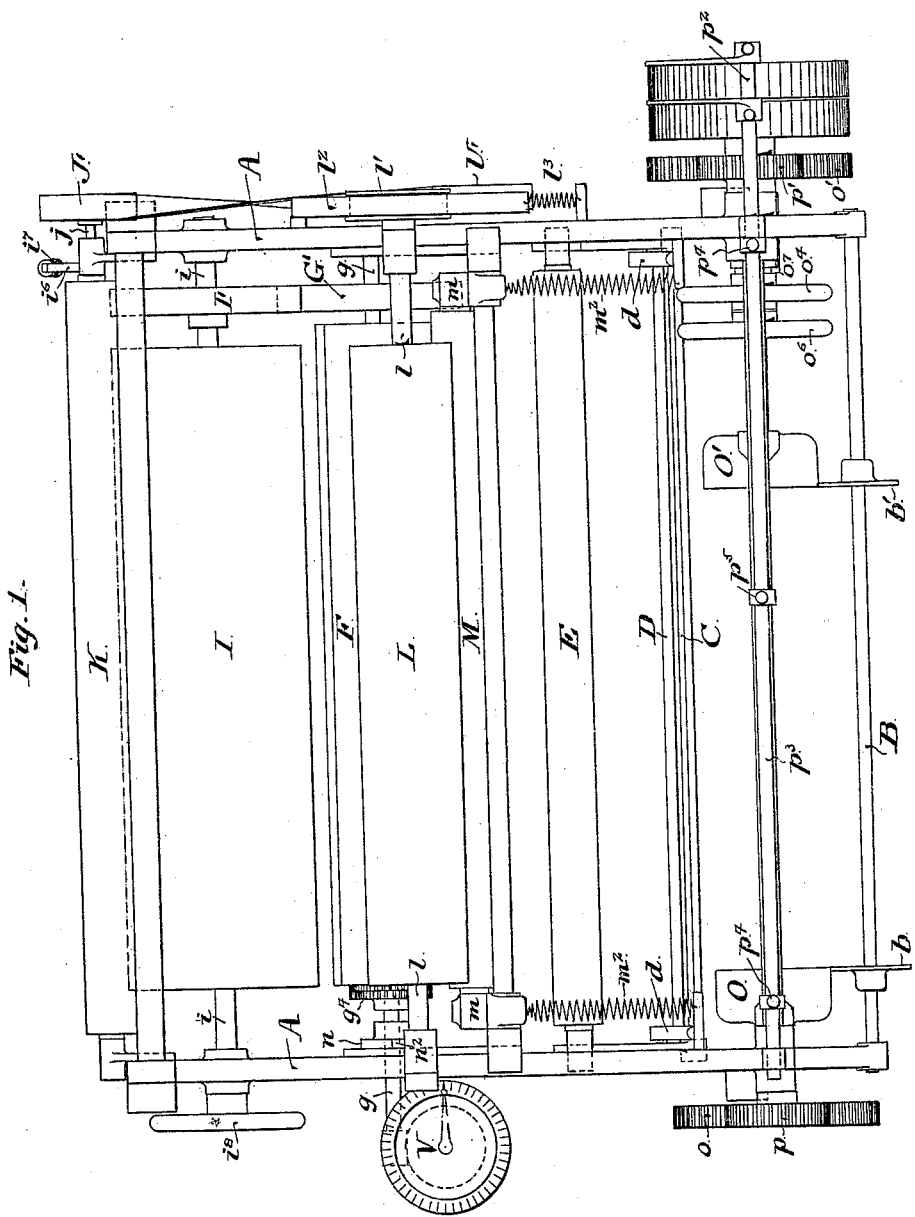

(No Model.) 8 Sheets—Sheet 1.
R. C. BORCHERS & I. N. FORRESTER.
MACHINE FOR MEASURING AND MARKING FABRICS.

No. 553,895. Patented Feb. 4, 1896.

WITNESS:
S. M. Burroughs.
James H. Bell.

INVENTORS:
Richard C. Borchers
Isaac N. Forrester (No Model.) 8 Sheets—Sheet 2.

R. C. BORCHERS & I. N. FORRESTER.
MACHINE FOR MEASURING AND MARKING FABRICS.

No. 553,895. Patented Feb. 4, 1896.

WITNESS:

INVENTORS:
Richard C. Borchers
Isaac N. Forrester

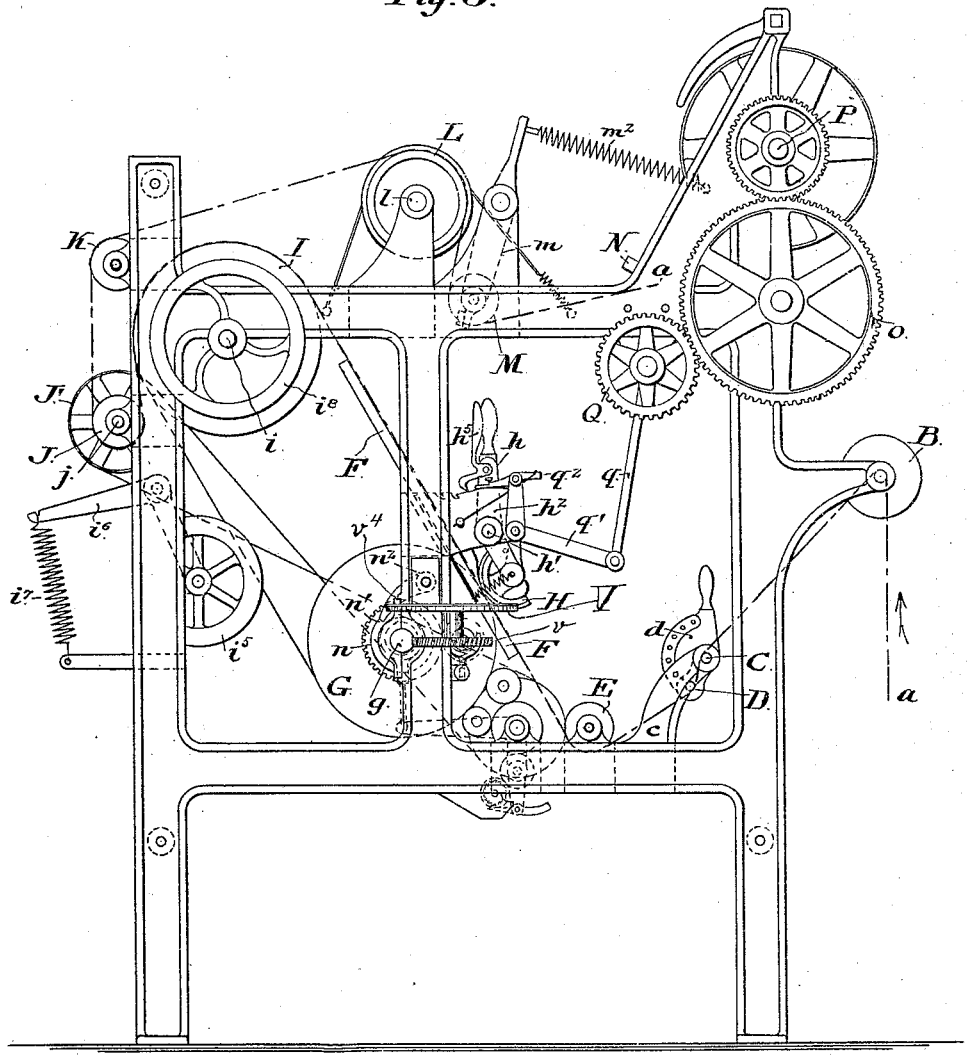

(No Model.) 8 Sheets—Sheet 4.
R. C. BORCHERS & I. N. FORRESTER.
MACHINE FOR MEASURING AND MARKING FABRICS.
No. 553,895. Patented Feb. 4, 1896.
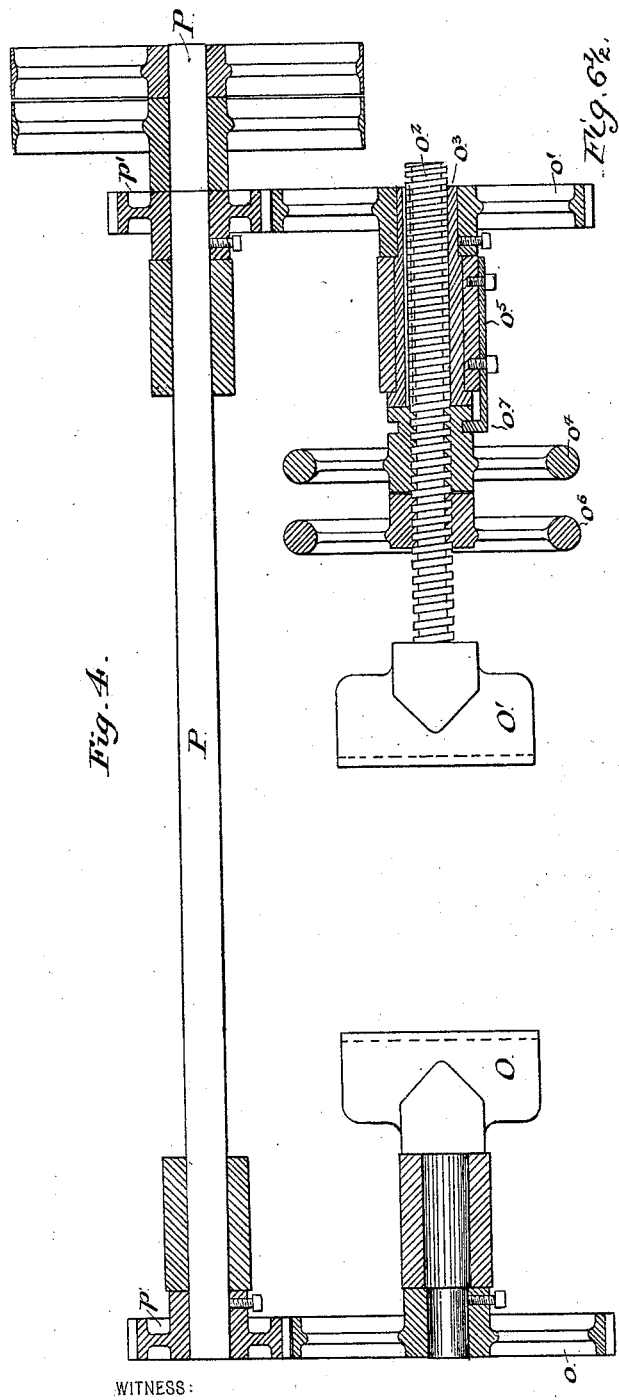
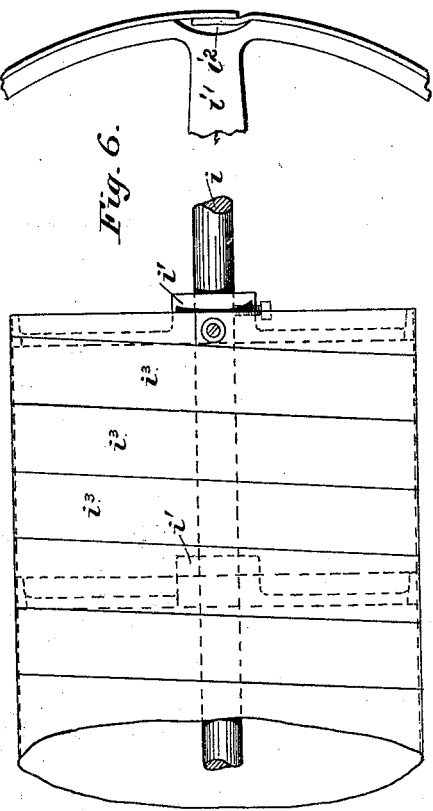
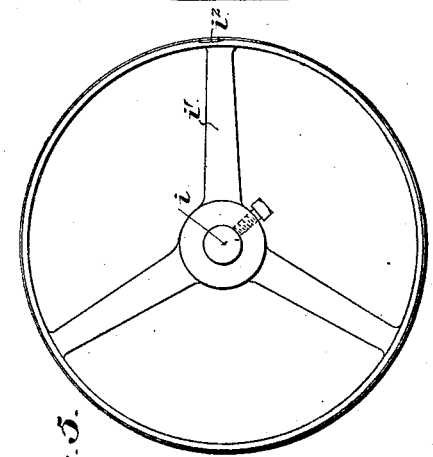
WITNESS:
INVENTORS:
Richard C. Borchers
Isaac N. Forrester (No Model.) 8 Sheets—Sheet 5.

R. C. BORCHERS & I. N. FORRESTER.
MACHINE FOR MEASURING AND MARKING FABRICS.

No. 553,895. Patented Feb. 4, 1896.

WITNESS:
S. M. Burroughs.
James H. Bell

INVENTORS:
Richard C. Borchers
Isaac N. Forrester (No Model.) 8 Sheets—Sheet 6.
R. C. BORCHERS & I. N. FORRESTER.
MACHINE FOR MEASURING AND MARKING FABRICS.
No. 553,895. Patented Feb. 4, 1896.
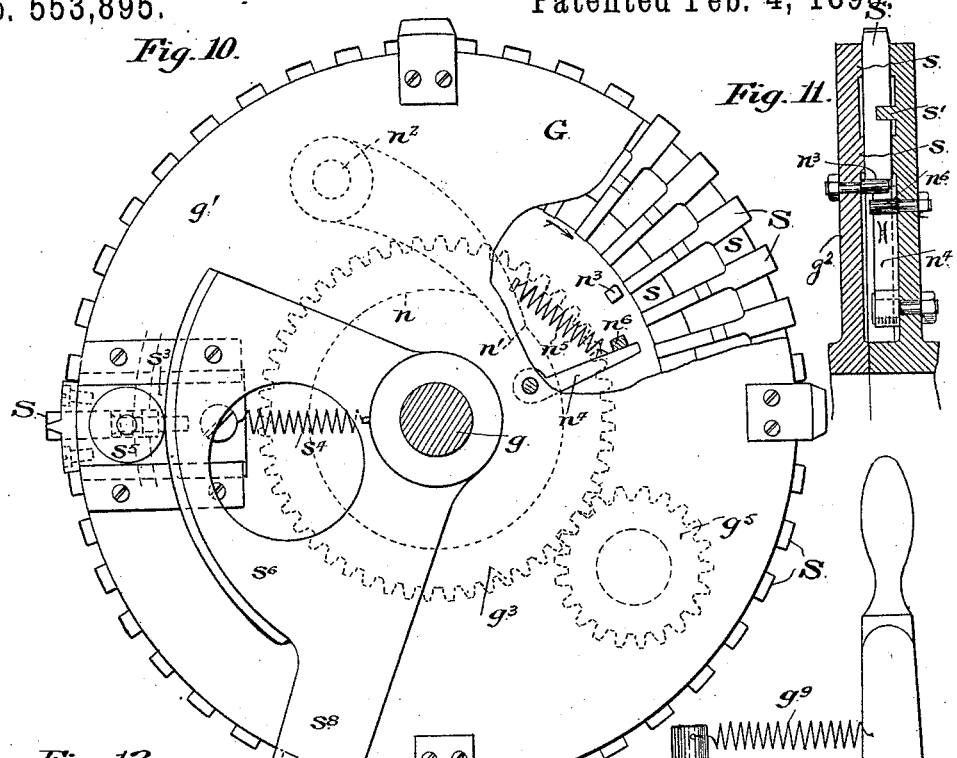
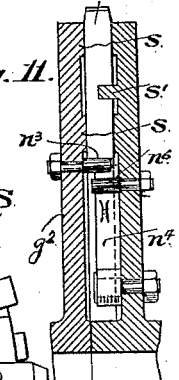
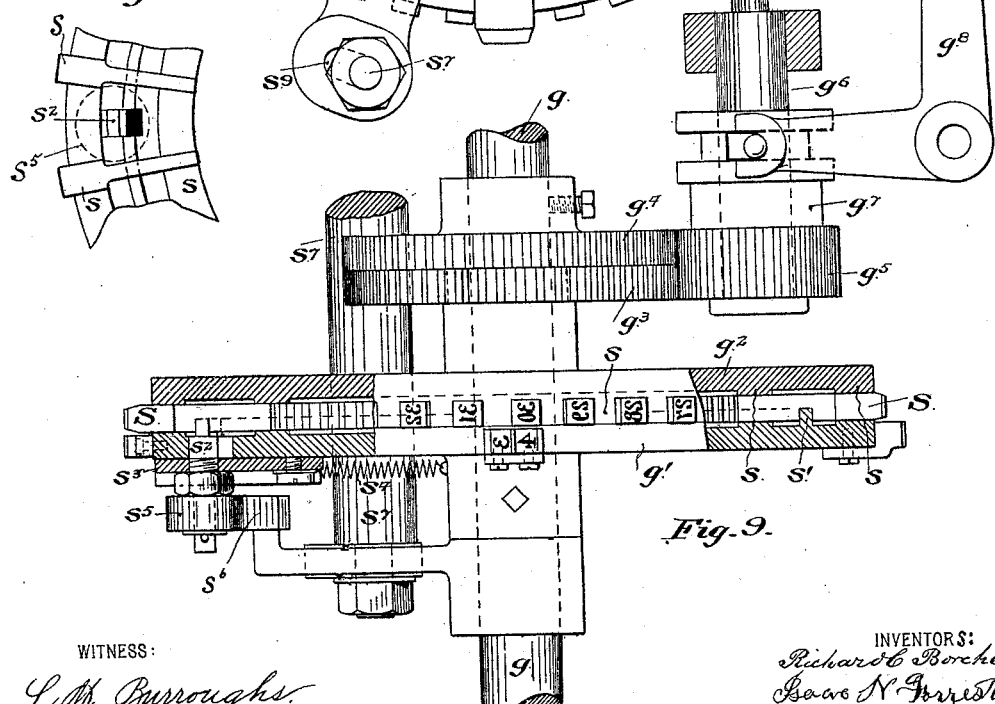
WITNESS:
S. M. Burroughs
James H. Bell
INVENTORS:
Richard C. Borchers
Isaac N. Forrester (No Model.) 8 Sheets—Sheet 7.
R. C. BORCHERS & I. N. FORRESTER.
MACHINE FOR MEASURING AND MARKING FABRICS.
No. 553,895. Patented Feb. 4, 1896.
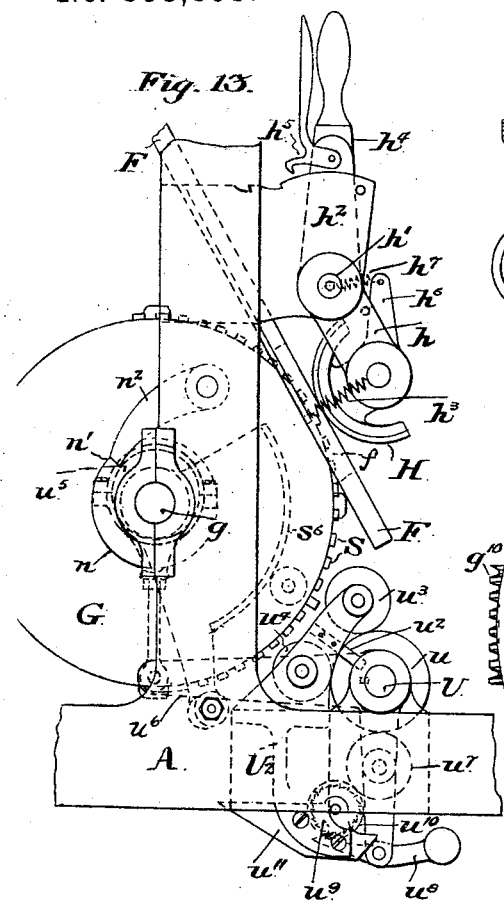
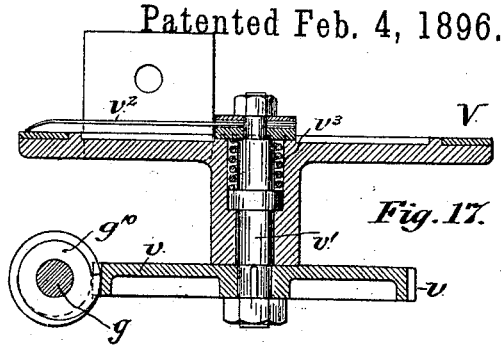
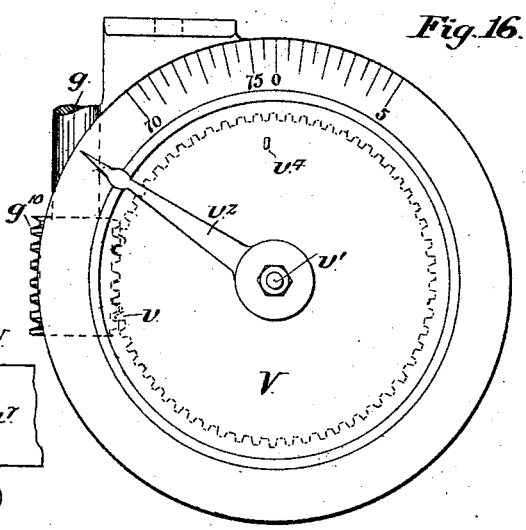
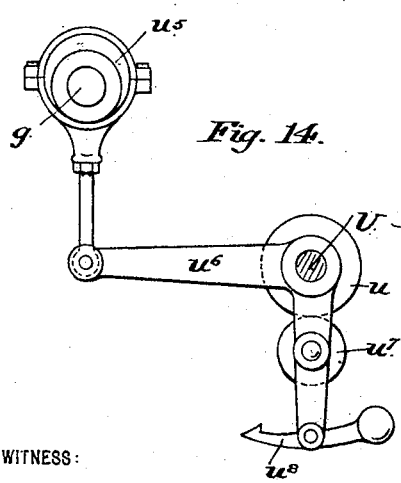
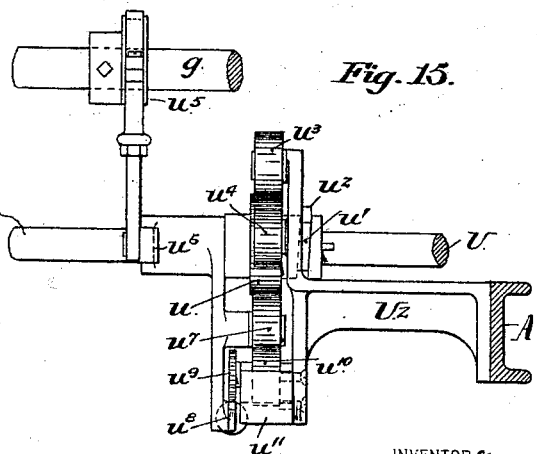
WITNESS:
S. H. Burroughs
James H. Bell
INVENTORS:
Richard C. Borchers
Isaac N. Forrester (No Model.) 8 Sheets—Sheet 8.
R. C. BORCHERS & I. N. FORRESTER.
MACHINE FOR MEASURING AND MARKING FABRICS.
No. 553,895. Patented Feb. 4, 1896.
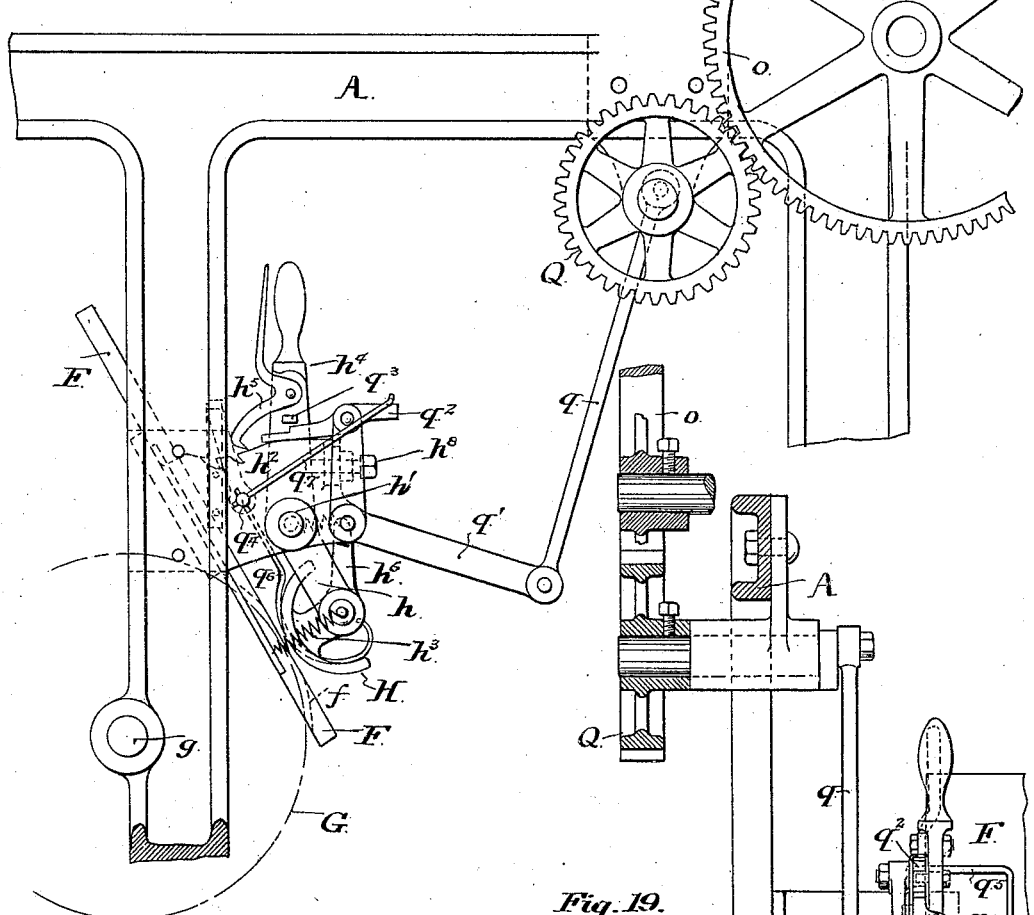
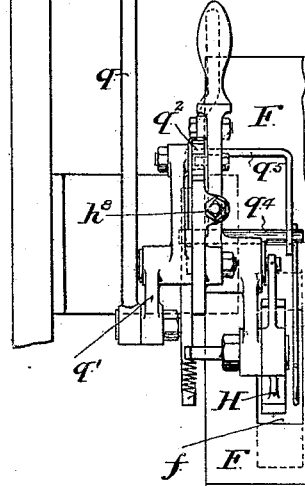
WITNESSES:
R. M. Burroughs
James H. Bell
INVENTORS:
Richard C. Borchers
Isaac N. Forrester

UNITED STATES PATENT OFFICE.

RICHARD C. BORCHERS AND ISAAC N. FORRESTER, OF PHILADELPHIA, PENNSYLVANIA; SAID FORRESTER ASSIGNOR TO SAID BORCHERS.

MACHINE FOR MEASURING AND MARKING FABRICS.

SPECIFICATION forming part of Letters Patent No. 553,895, dated February 4, 1896.

Application filed November 21, 1894. Serial No. 529,464. (No model.)

*To all whom it may concern:*

Be it known that we, RICHARD C. BORCHERS and ISAAC N. FORRESTER, citizens of the United States, residing at Philadelphia, in the State of Pennsylvania, have invented a certain new and Improved Machine for Measuring and Marking Fabrics, whereof the following is a specification, reference being had to the accompanying drawings.

Our invention relates to a machine, through which textile fabrics of all sorts may be passed, which indicates upon the dial the length of the fabric which has been passed through, and stamps or prints the length at appropriate intervals upon the edge of the fabric, and winds the fabric so marked into the completed roll in the shape in which it is to be put upon the market, and to this end relates more specifically to the construction and arrangement of the cloth-rollers, tension, take-up and winding devices, and to the construction and mode of operation of the indicating-dial, the printing-wheel, the presser-sector and the inking device, to the means of adjustment between the main measuring-roller and the printing-wheel, and to certain other details hereinafter more specifically described and enumerated in the claims.

Figure 2:
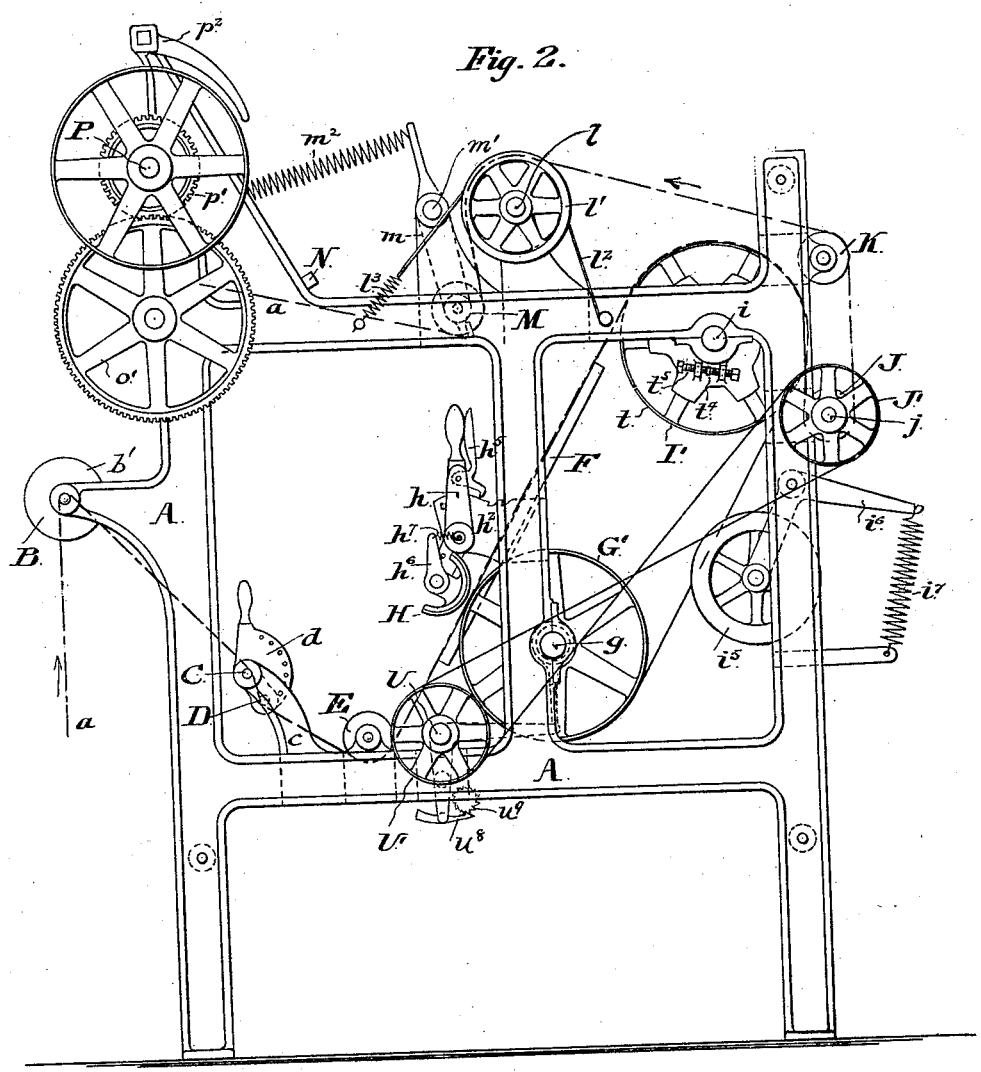
Figure 7:
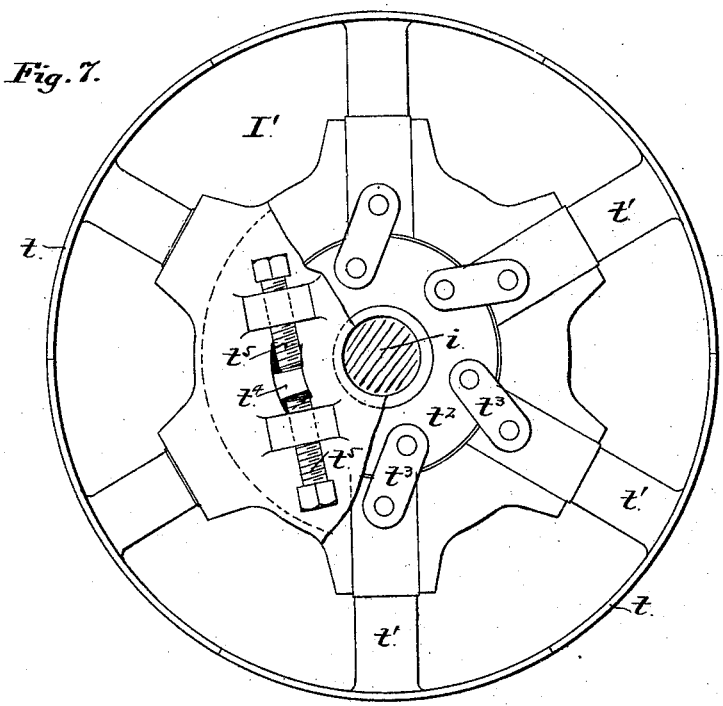
Figure 8:
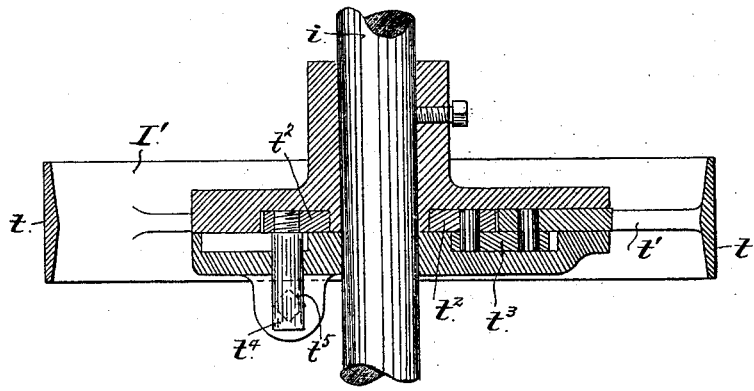

In the accompanying drawings, Figure 1 represents a plan view of our machine. Fig. 2 is a side elevation seen from the right of Fig. 1, and Fig. 3 is a side elevation seen from the left of Fig. 1. Fig. 4 is a vertical longitudinal section of the winding device. Figs. 5 and 6 are respectively an end and side view of a portion of the main measuring-roller. Fig. 6½ shows in detail the shoulder (lettered $i^2$) and its adjacent parts. Figs. 7 and 8 show in detail the expansible pulley. Figs. 9, 10, 11, and 12 show details of the printing-wheel. Figs. 13, 14, and 15 show details of the inking device, and also in Fig. 13 details of the presser-sector. Figs. 16 and 17 show details of the dial-plate and indicator. Figs. 18 and 19 show details of the device for automatically raising the presser-sector.

A A indicate the standards at either end of the machine, which constitute its supporting-framework. Between these standards are mounted a series of parallel horizontal rollers and rods around which the fabric travels successively in passing through the machine.

The fabric enters the machine from the front and its course (indicated by the broken lines $a\ a$, Figs. 2 and 3) is as follows: Over the guide-rod B, over and under the smoothing-rods C D, under the roller E, along the face of the oblique guide-board F, at one point in which the edge of the fabric passes between the printing-wheel G and the presser-sector H, over the main measuring-roller I, under the companion roller J, over the roller K, where the fabric turns back toward the front of the machine, over the tension-roller L, under the take-up roller M, under the measuring-rod N to a rod or board mounted between the revolving bits O O', upon which it is wound ready for packing. The bits are driven from the main shaft P directly above them, but all the other rollers or moving portions are driven either directly or indirectly by the friction of the cloth as it passes around the rollers and is pulled through the machine by the revolution of the rod or board upon which it is being wound. These portions of the machine will now be described in the order above mentioned, and their successive functions will be explained at the same time.

The guide-rod B is mounted between the standards at either side of the machine. It does not revolve, but carries two guide-disks $b\ b'$. The disk $b$ near the left-hand end is fixed, owing to the fixed position of the printing-wheel, which must operate upon the left-hand edge of the fabric. The right-hand disk $b'$ is adjustable according to the width of the fabric. The fabric is allowed to run over this rod B and is accurately guided by the disks, so that it enters the machine at precisely the proper place and exactly in a straight line, and with no tension but that which results from running over the rod.

The smoothing-rods C D do not revolve. The rod C is held in a fixed position between the upwardly-projecting arms $c\ c$ at either side of the machine. The accompanying rod D is mounted at either end upon revolving plates $d\ d$, swiveled upon the rod C at either side. By moving the plates the position of the rod D with reference to the rod C may be varied so as to alter the character of the sigmoid curve described by the fabric around the rods, and therefore the degree of tension imparted.

The plates are provided with suitable means for setting them in any desired position. The position of the rods may be varied according to the elasticity of the fabric. They should not, however, impart any unnatural tension to the fabric, but are only intended to smooth it out, in order that it may be measured while in a perfectly normal condition.

The roller E revolves upon bearings upon the standards at either side of the machine. It performs no other function than to guide the fabric truly to the upper surface of the board F.

The guide-board F is mounted obliquely between the standards, and serves the purpose of keeping the entire width of the fabric perfectly flat, which is necessary in order that the fabric may be stamped at the edge, and also because elastic fabrics, which tend to curve at the edge, gain slightly in length unless kept flat. Near the left-hand lower edge of the board is cut a vertical slot $f$, through which the edge of the printing-wheel passes from beneath.

The printing-wheel G is mounted upon a shaft $g$, revolving in bearings in the standards at either side. This shaft is driven by a pulley G' near the right-hand end of the shaft, connected by a belt with the expansible pulley I' upon the shaft $i$, carrying the main measuring-roller I. The method of adjustment between the measuring-roller and the printing-wheel will be subsequently described. Suffice it to point out here that the adjustment is such that for each unit of length of the fabric (which for the purposes of this specification will be considered one yard) drawn over the guide-board F the shaft $g$ revolves once.

The periphery of the printing-wheel projects part way through the slot of the guide-board, which has been spoken of, and carries types which either normally or when projected reach quite through the slot, so as to be capable of making their imprint upon the fabric as it is drawn over the slot. The printing-wheel consists of two equal concentric disks fitting closely alongside of each other. Of these the right-hand disk, $g'$, (the lower in Fig. 9,) is fast upon the shaft $g$, which, as before explained, revolves once for every yard of fabric passing over the guide-board. It carries upon its periphery four fixed types, one for each quadrant, which print, respectively, $-, \frac{1}{4}, \frac{1}{2}, \frac{3}{4}$, the dash-type indicating the completion of the yard and the others the quarters. These types project at all times quite through the slot, so as to print successively on the fabric as it rolls between the wheel and the opposing pressure-segment. The left-hand disk, $g^2$, (the upper in Fig. 9,) is mounted on a collar surrounding the shaft $g$. Upon the other end of this collar is formed a gear-wheel $g^3$, and alongside of this gear-wheel, but fast upon the shaft, is a second gear-wheel $g^4$, exactly equal in diameter, but having one more tooth. Both these gear-wheels mesh with a single small gear-wheel $g^5$, which has a width equal to their combined width and which is mounted on a collar $g^7$, surrounding a short shaft $g^6$. The collar and with it the gear-wheel $g^5$ are capable of sliding longitudinally upon the shaft $g^6$, this motion being controlled by a shifting-lever $g^8$. (Seen in Fig. 9.) A spring $g^9$ tends to hold the gear-wheel $g^5$ normally in engagement with both the wheels $g^3$ and $g^4$; but when the shifting-lever is drawn against the spring it withdraws the gear-wheel $g^5$ from engagement with the wheel $g^3$, thereby leaving the latter wheel, and consequently the left-hand disk, $g^2$, free to revolve upon the shaft $g$ independent of its motion. When, however, the wheel $g^5$ is in engagement with both the wheels $g^3$ and $g^4$, the former is driven by but revolves slightly faster than the shaft $g$, so that the left-hand disk, $g^2$, advances constantly upon its fellow $g'$, the amount of gain for each revolution equaling the ratio of one tooth of the gear-wheel $g^3$ to the whole number of its teeth. The left-hand disk, $g^2$, also carries around its periphery a number of types S equidistantly spaced. These types are movable and do not normally project as far as the types upon the disk $g'$, and consequently do not print upon the fabric unless they are projected as hereinafter described. They are mounted in suitable radial slots formed in the annular shoulders $s\ s$, which project from the side of the left-hand disk, $g^2$, which opposes its fellow. Within these slots the types are capable of being projected sufficiently to reach the fabric, but are normally prevented from being so projected by an annular shoulder $s'$, which is formed upon the side of the disk $g'$ which opposes its fellow, which shoulder is received in a series of nicks formed in the edge of the types. This shoulder $s'$ is broken at a single point directly in radial line with the dash-type on its disk. The break is somewhat longer than the width of the stems of the types S (about twice the width) and is filled by a movable piece $s^2$, with a corresponding length of shoulder, which piece slides radially within a short slot. The length of this slot is such that when the movable piece is projected to its outer end that type the nick of which at the time engages with its shoulder will be projected far enough to print upon the fabric.

The movable piece $s^2$ is carried by a slide-plate $s^3$, running radially in a slideway formed upon the outside of the disk $g'$. The spring $s^4$ tends to hold this slide-plate, and consequently the movable piece $s^2$, in its position toward the center of the disk, in which position its shoulder is in line with the shoulder $s'$. A roller $s^5$ is pivoted on the outer side of the slide-plate in such position that its edge comes into contact, during a portion of the revolution of the disk $g'$, with the periphery of a sector-plate $s^6$, mounted centrally and loosely upon the shaft $g$, but held in a fixed position by a rod $s^7$, projecting in from the standard of the machine, to the inner end of which the radial arm $s^3$ of the sector is bolted. A slot $s^9$ in the arm, through which the bolt passes, renders the position of the sector adjustable within a small limit. The radius of the sector-plate is such that for that portion of the revolution of the disk $g'$ during which the roller $s^5$ is in contact with its periphery the roller, and with it the movable piece $s^2$, is projected against the action of the spring $s^4$ sufficiently far for the type which is in engagement with it to be projected to the position in which it is capable of imprinting the fabric. The sector-plate is adjusted so that part of its peripheral arc comes opposite to the presser-sector H, which presses the fabric against the type. The number of types in the disk $g'$ must be made sufficiently great to be able to print more yards than are ever likely to be run through the machine in a single piece of fabric—say seventy-five. (In Fig. 10 but forty-two types are shown.) The number of teeth upon the gear-wheel $g^3$ must equal that of the number of types S in the disk $g^2$, so that for each revolution of this gear-wheel the disk $g^2$ advances the space of one type upon the disk $g'$, thereby bringing the next successive number opposite the dash-type of the latter. It will therefore be seen that as the disk $g'$ revolves, printing its quarter-yards upon the fabric, one of the movable types upon the disk $g^2$ is always projected alongside the dash-type of the disk $g'$, in position to print, during that portion of its revolution when the roller $s^5$ has its edge in contact with the peripheral arc of the sector-plate $s^6$, and the length of arc and the position of this sector-plate are so adjusted that these projections take place during that portion of the revolution of the printing-wheel when it is needed first for the purpose of inking the types, as hereinafter described, and then for the purpose of printing and during that portion only. The faster motion of the disk $g^2$ brings another and successive type alongside the dash-type in position to print at each revolution of the disk $g'$.

The presser-sector H is seen best in Fig. 13, where the automatic adjustment, hereinafter described and seen in detail in Figs. 18 and 19, is omitted. It is pivoted at its center to one extremity of the lever $h$, which is itself pivoted at $h'$ to the wall of a double bracket-plate $h^2$, affixed to the left-hand standard. The lever $h$ is by the spring $h^3$ held normally so that the periphery of the sector opposes pressure to the projecting types of the printing-wheel, the limit of this pressure being fixed by the set-screw $h^8$, (seen in Fig. 18;) but by means of the handle $h^4$ at the other end of the lever and the pivoted catch $h^5$, engaging with the top of the plate $h^2$, this pressure may be removed. This position of the sector upon its own center is determined by the arm $h^6$, affixed to it and connected with the pivot of the lever $h$ by a spring $h^7$. The simple motion of the cloth under the sector does not afford sufficient friction to cause it to revolve appreciably upon its center against the action of the spring $h^7$. When, however, the printing-wheel revolves and the advanced types oppose their surfaces to that of the sector with the fabric between, the friction causes the sector to roll a short distance on its center until, the types having passed, the friction is removed and the spring $h^7$ draws the sector back to its normal position, as seen in Fig. 13. The periphery of the sector may be furnished with a rubber or cloth surface.

The inking device, which will be described in this connection, is seen in detail in Figs. 13, 14 and 15. A shaft U passes from side to side of the machine and revolves in suitable bearings in the standards at either side. It is driven at the right-hand end by a pulley U′, connected by a cross-band with a corresponding pulley J′ upon the shaft which carries the roller J. Upon the shaft U, in the vertical plane of the printing-wheel, but of somewhat greater width, is an inking-roller $u$, sliding laterally upon a feather on this shaft, the extent of its lateral motion being determined by the cam-groove $u'$, surrounding the collar and receiving the stationary lug $u^2$.

From the interior of the left-hand standard of the machine there projects in proximity to the shaft U an arm $U^2$, to an upward projection of which are pivoted the companion inking-rollers $u^3$ $u^4$, the peripheries of both of which rest against and are driven by that of the roller $u$, which latter, however, has a slightly-greater width to allow for the lateral movement effected by the cam-groove. These inking-rollers $u^3$ $u^4$ are of different radius and are of such size that their peripheries reach to the types projecting from the printing-wheel, and the relative sizes of the pulleys by which the shaft U is driven and of the inking-roller $u$ are such that the speed of the peripheries of the inking-rollers $u^3$ $u^4$ precisely equals that of the face of the types on the edge of the printing-wheel, thereby allowing the types to pass smoothly over their surfaces without rubbing.

The position of the sector-plate $s^6$ is such that the types from the disk $g^2$ are projected during their opposition to these inking-rollers as well as during their opposition to the presser-sector H. Upon the shaft $g$ is an eccentric $u^5$, the connecting-pin of which is pivoted to one end of the bell-crank lever $u^6$, which is itself pivoted upon the shaft U, rocking freely upon it. The other arm of this bell-crank lever carries the inking-roller $u^7$ in proper plane and position to have its surface always in contact with that of the roller $u$ notwithstanding the rocking of the bell-crank lever. The extremity of this arm also carries pivoted to it a pawl $u^8$, one end of which is weighted, while the other carries a detent engaging with a ratchet-wheel $u^9$, which revolves upon a short shaft to which is affixed the inking-roller $u^{10}$. This latter inking-roller revolves with half its surface immersed in the ink contained within the ink-box $u^{11}$. By reason of the action of the eccentric the lower extremity of the bell-crank lever operates as a pawling-rod, slowly revolving the inking-roller $u^{10}$, while at the same time the inking-roller $u^7$ is by the operation of the same eccentric gently patted at intervals against it, receiving ink therefrom. The roller $u^7$ is always in contact with the roller $u$ and communicates its ink to it, the slight lateral motion of the latter serving to distribute it evenly across its surface. From the roller $u$ the ink is in turn communicated to the rollers $u^3$ $u^4$, and from thence to the projecting types.

The indicating-dial V is mounted horizontally upon a bracket-arm projecting out from the left-hand standard of the machine. The shaft $g$, as has been pointed out, revolves once for every yard of fabric passing through the machine. This shaft is continued a short distance through the left-hand bearing and carries upon its extremity a worm $g^{10}$. This worm engages a gear-wheel $v$ upon a short vertical shaft $v'$, revolving in a bearing coincident with the center of the dial-plate V. The upper extremity of this shaft carries a pointer $v^2$, playing over the dial-plate and surrounding rather loosely the shaft. The spring $v^3$ surrounds the shaft and presses between a shoulder on it and the lower side of the pointer, so as to cause the latter to revolve with the shaft, except when it is prevented from doing so either by the stop $u^4$ or by hand.

The dial-plate is divided into as many divisions as there are types upon the disk $g^2$, and the worm and gear by which its pointer is driven are so spaced that each revolution of the shaft $g$ advances the pointer one division of the dial-plate. A small stop $v^4$ serves to prevent the pointer from overrunning the figures of the dial and also serves as a stop against which the pointer is set when it is turned back at the commencement of each new roll of fabric to be passed through the machine, the strength of the spring $v^3$ readily allowing it to be thus moved backward or forward independent of the revolution of the shaft $v'$.

The main measuring-roller I is constructed upon a shaft $i$, carried in suitable bearings in the standards at either side. This roller may be of any desired circumference, although it is convenient to make it about a yard. It is necessary, however, that it should be perfectly true, as nearly constant in size as possible, and furnished with a firmly-attached roughened surface. To attain these objects it is constructed as follows: A series of spider-frames $i'$ are fixed to the shaft $i$ at suitable intervals. Around this series of frames a roll of sheet metal slightly longer than the circumference is wrapped. The overlapping edges are evenly joined by means of a shoulder $i^2$ formed on the lower flap, which is received all along its width into a corresponding depression in each of the spider-frames. The joint along the edges and the attachment to the frames are effected by soldering, so that there are no projecting rivets or other break in the even surface of the roll around which the fabric passes. A metal roller is less affected in size by heat or cold than a wooden roller is by moisture, and therefore is as nearly constant in diameter as it is possible to make a roller. To the smooth surface of this roller is attached a thickness of sandpaper-cloth. This is cut in a single long strip $i^3$ and wound around the roller spirally, as seen in Fig. 6. It is affixed by cement and secured at each end by a bolt. When the surface has worn smooth, the cloth may be readily unwound and renewed.

Upon the shaft $i$, to the right of the measuring-roller, is fixed an expansible pulley G' upon the shaft $g$. By varying the size of the expansible pulley the ratio of the revolutions of the shafts $g$ and $i$ may be adjusted with the utmost nicety, so that whatever the circumference of the roller I the printing-wheel G will revolve once to the yard of fabric drawn over it. The details of this expansible pulley are seen in Figs. 7 and 8. Its periphery is formed in segments $tt$, each mounted upon separate spokes $t'$, which slide in and out in slideways formed in the hub. Within the hub, which is formed of two concentric disks, is a ring $t^2$, which is capable of a partial rotation within the hub. Each spoke is connected to the ring by an inclined link $t^3$. When the ring is rotated a short distance in the proper direction, the links assume a more nearly radial position, and consequently the spokes project farther and enlarge the pulley. The position of the ring within the hub is fixed by a short lug $t^4$, projecting from the ring through a circumferential slot on one side of the hub. Two opposing set-screws $t^5$ regulate the position of the lug which is held between them, and according as it is thrown toward one or the other extremity of its play are the spokes projected or drawn back, and consequently the size of the pulley increased or decreased.

A compensation-pulley $i^5$ is pivoted to one end of a bell-crank lever $i^6$, the other end of which is depressed by a strong spring $i^7$. This pulley $i^5$ presses against the belt connecting the pulleys I' and G' and takes up any slack in the belt due to diminution of the diameter of the expansible pulley. Upon the left-hand extremity of the shaft $i$, outside the standard, is a hand-wheel $i^8$, which, on account of the connection between the shafts $i$ and $g$, affords a convenient way of turning the printing-wheel when it is desired to adjust it by hand.

The companion roller J is similar in mounting and construction, though of smaller size, to the roller I. Its shaft $j$ carries the pulley J', by a belt from which the shaft U is driven, at the right-hand end of the machine.

The roller K is similarly mounted directly above the roller J and serves no other purpose than to allow the forward deflection of the fabric. One roller may readily be made to perform the functions of both J and K.

Thus far the fabric has been subject to only very slight tension in order that the measuring and marking may be done without any unnatural stretch of the fabric. The winding, however, is best accomplished under a higher tension, and this is effected by the roller L. It is made with a roughened surface similar to I, and its shaft $l$ is carried in bearings at either side of the machine. Exterior to the right-hand bearing this shaft carries a friction-wheel $l'$, around a portion of which a band-brake $l^2$ is wrapped. The metal band which forms this brake is subjected to the tension of the spring $l^3$.

If the fabric is to be wound upon a roll, it may pass directly to it from the tension-roller L, but in case a board is to be used it passes under the take-up roller M. Winding upon a board which revolves unevenly produces an irregular pull, and consequently a varying speed of the fabric. To accommodate this and render the speed of the measuring-roller as nearly as possible constant is the function of this roller M. It is mounted between two swinging arms $m\ m$, depending from the rock-shaft $m'$. These arms also project upwardly a short distance above the rock-shaft, and to their upper extremities are attached the springs $m^2$, projecting from the standards. The springs $m^2$ tend to force the roller M back under the tension-roller L, causing the former to act as an elastic take-up.

The square bar N running between the standards affords a fixed point to which the end of the fabric is to be drawn before the presser-sector is released, so as to press on the cloth and the printing allowed to proceed. The length of fabric between this bar and the point where the fabric crosses the printing-wheel is a fixed quantity and must be determined with accuracy. It is convenient to have it three yards. When the fabric has been drawn through to this point, the printing-wheel must be adjusted to correspond. This is effected as follows: Upon the shaft $g$, near its left-hand bearing, is a ratchet-wheel $n$, having a single click-space $n'$, which plays beneath the detent $n^2$, pivoted to the inside of the standard. The click-space is so inclined as to allow free revolution of the printing-wheel in its normal direction, but to prevent its making more than a partial revolution backward. The click-space is so placed that when turned back to it the disk $g'$ will be in a proper position to correspond to the length of fabric between the printing-wheel and the rod N. If this distance is an even number of yards—say three—then the click-space must stop the disk $g'$ with the dash-type just in position to print. If the distance is, say, two and one-half yards, then the $\frac{1}{2}$-type must be in position to print, and so on. The cloth having been adjusted to this point and the shaft $g$ having been turned back until the detent stops it, the disk $g^2$ must now be turned so as to bring opposite to the dash-type the figures which should first print. Upon the supposition that the fabric run through is three yards this will be the figure "3." In order to facilitate turning to this figure, a small lug $n^3$ is fixed at the proper point on the inside surface of the disk $g^2$. A one-way stop is similarly affixed to the disk $g'$, consisting of swiveled arm $n^4$, spring $n^5$, and stop-pin $n^6$. This one-way stop allows the lug $n^3$ to pass it when the disk $g^2$ is revolving in its normal direction, a necessary precaution in order to prevent breakage should the disk $g^2$ overrun its types. The lug $h^3$ is, however, so placed that when the disk is turned by hand backward it comes in contact with and is stopped by the one-way stop as soon as the proper initial type is opposite the dash-type. This facilitates the commencement of a new series of numbering at the expiration of a piece. For this purpose the machine is temporarily stopped and by pressing back the lever $g^8$ the disk $g^2$ is freed from positive control. It is then turned back by hand until stopped by the mechanism just described, which, as explained, opposes the initial type to the dash-type. At the same time the pointer of the dial-plate is turned back to its initial point, an operation which is facilitated by the stop $v^4$ previously mentioned. The lever $g^8$ having been released, the mechanism is again started, and the printing operation begins again as the cloth is drawn forward by the roll or winding-board.

The board is held between two bits O O'. The left-hand bit is centered upon a spindle passing through a bearing in the standard on that side and carries at its outward extremity the gear-wheel $o$. The right-hand bit, O', is similarly centered upon a screw-spindle $o^2$, which runs freely in a sleeve $o^3$, but which has a key traveling in a keyway in the spindle $o^2$. The sleeve $o^3$ revolves within a bearing in the right-hand standard and carries exterior to the standard the gear-wheel $o'$. The right-hand bit is adjusted by the hand-wheel $o^4$, with an interior screw-thread which revolves upon the screw of the spindle $o^2$. The wheel is held close against the sleeve $o^3$ by a lug $o^7$ on a plate $o^5$, bolted against the bearing, which lug travels in an annular groove in the hub of the wheel. When the bit has been adjusted by the revolution of the hand-wheel $o^4$ it is set by a second hand-wheel, $o^6$. Above the bits and in the same vertical plane is the shaft P, revolving in bearings in the standards and carrying gear-wheels $p\ p'$, which gear with the wheels $o\ o'$, by which the bits are simultaneously driven. The end of the shaft P carries a driving and an idle pulley, to either of which the driving-belt is thrown by a belt-shifter $p^2$ upon the extremity of the slide-rod $p^3$. This slide-rod has appropriate stops $p^4$ and a handle $p^5$, situated in the middle of the machine and therefore convenient to the operator. The bits O O' shown are suitable for holding a board. They may, however, be removed and replaced by ones suitable for holding a roller.

A device may be provided in the machine whereby when the fabric which is being measured has passed between the printing-wheel and the opposing presser-sector the latter is automatically thrown back during the winding of the remaining portion of the cloth. This is desirable because unless some such device is provided the revolving printing-wheel will draw the inked faces of the types over the surface of the presser sector, smearing it with ink and causing the succeeding fabric which may pass beneath it to be improperly marked with lines along the edges. This automatic device for raising the presser-sector is seen in detail in Figs. 18 and 19.

A gear-wheel Q is mounted upon a bearing in the left-hand standard and gears with the wheel $o$, so as to be driven thereby. The shaft of this gear-wheel Q carries upon the other side of its bearing a crank-pin upon which is pivoted the connecting-rod $q$, the other end of which is pivoted to the bell-crank lever $q'$. This lever is centrally pivoted to that wall of the double bracket-plate $h^2$ to which the lever $h$ carrying the presser-sector is pivoted. The upper arm of the lever $q'$ has pivoted at its extremity a cross-lever $q^2$, the rear end of which when raised comes into engagement with a stop-pin $q^3$ upon the handle on the upper end of the lever $h$. The lever $q^2$ is, however, so balanced that normally it does not engage this stop-pin. Consequently the rocking of the lever $q'$ by the revolution of the wheel Q has no effect upon the lever carrying the presser-sector.

A short rocking pivot $q^4$ is carried between the wall of the bracket-plate $h^2$ and a recurved arm $q^5$ fastened thereto. This rocking pivot has passing through it at about right angles to each other two wire rods $q^6$ $q^7$. The lower of these, $q^6$, is bent so as to present a convex curve to the upper surface of the guide-board F where the fabric passes over it. A slot is cut in the board immediately beneath that portion of the rod which opposes it, into which the rod falls when no cloth is passing over the board. The upper rod, $q^7$, rests at its extremity upon the forward end of the cross-lever $q^2$. The angle of the two rods $q^6$ and $q^7$ to each other is such that whenever the lower one, $q^6$, falls into the slot of the board F by reason of there being no fabric running over its surface the upper one, $q^7$, weighs down the forward end of the cross-lever $q^2$, so that its rear end is capable of engaging the stop-pin of the handle of the lever $h$. This occurs as soon as the end of a piece of fabric has run over the board, and consequently the next revolution of the wheel Q throws back the handle of the lever $h$, so as to raise the presser-sector and prevent it from coming in direct contact with the inked types of the printing-wheel, as it continues to revolve, until the fabric has been entirely wound and the machine stopped.

Having thus described our invention, we claim—

1. In a fabric measuring and printing machine, the combination of the rollers around which the fabric is drawn through the machine; a revolving printing-wheel composed of two concentric disks, one of said disks being furnished with a continuous series of radially-projectable integer-types, and the other with a continuous series of fixed fractional types; a rolling surface opposed to the periphery of the printing-wheel and pressing the fabric to be measured against the fractional types and such of the integral types as may be projected; mechanism whereby with each complete revolution of the disk carrying the fractional types the disk carrying the integral types is advanced one figure; and mechanism whereby the integral type alongside of the dash-type is projected whenever the latter passes under the rolling surface, substantially as described.

2. In a fabric measuring and printing machine, the combination of the rollers upon which the fabric is drawn through the machine; a revolving printing-wheel composed of two concentric disks, one of said disks being furnished with a continuous series of radially-projectable integer-types, and the other with a continuous series of fixed fractional types; a rolling surface opposed to the periphery of the printing-wheel and pressing the fabric to be measured against the fractional types and such of the integral types as may be projected; mechanism whereby with each complete revolution of the disk carrying the fractional types the disk carrying the integral types is advanced one figure; an inking-roller opposed to the periphery of the printing-wheel and inking the surface of the fractional types and such of the integral types as may be projected; and mechanism whereby the integral type alongside of the dash-type is projected whenever the latter passes under the inking-roller, and also whenever it passes under the rolling surface, substantially as described.

3. In a fabric measuring and printing machine the combination of the rollers around which the fabric is drawn, an inking-roller, and a fabric-pressing roller, of a printing-wheel composed of the following elements: a revolving disk; a series of radial slots upon the periphery thereof; a series of continuously-numbered projectable types seated in said slots; mechanism whereby said types are normally held immovable in their withdrawn position; and mechanism whereby in regular succession each one of said types is released and advanced to its projected position, substantially as described.

4. In a fabric measuring and printing machine, the combination with the rollers around which the fabric is drawn, an inking-roller and fabric-pressing roller, of a printing-wheel composed of the following elements: a revolving disk furnished with a continuous series of radially-projectable integer-types; a concentric revolving disk furnished with a continuous series of fixed fractional types; mechanism whereby as the two disks revolve the integral types of the one are successively brought alongside of the dash-type of the latter with each revolution; mechanism whereby the integral type alongside of the dash-type is at the proper moment advanced to the latter's level for the purpose of printing; and mechanism whereby all of the other integral types are immovably held in their withdrawn position, substantially as described.

5. In a fabric measuring and printing machine, the combination with the rollers around which the fabric is drawn, an inking-roller and fabric-pressing roller, of a printing-wheel composed of the following elements: a disk, $g^2$, having one or more annular shoulders, $s$; a series of projectable types lying in radial slots formed in said shoulder; a disk, $g'$, alongside of the disk, $g^2$, but revolving independently thereof; a movable piece, $s^2$, sliding radially in the disk, $g'$, and projecting radially that one of the types in the disk, $g^2$, with which it is in contact; mechanism whereby the revolution of the disks, $g^2$, $g'$, are so adjusted that the types of the former oppose themselves successively to the movable piece of the latter; and mechanism whereby the movable piece of the disk, $g'$, is caused to advance the type of the disk, $g^2$, with which it is in contact during that portion of the revolution of the two disks when its advancement is necessary for the purposes of inking and printing, substantially as described.

RICHARD C. BORCHERS.
ISAAC N. FORRESTER.

Witnesses:
JAMES H. BELL,
E. REESE.